United States Patent [19]
Wells

[11] 4,068,147
[45] Jan. 10, 1978

[54] METHOD AND APPARATUS FOR HEATING AND COMPRESSING PLASMA

[76] Inventor: Daniel R. Wells, 6950 S.W. 62nd St., Miami, Fla.

[21] Appl. No.: 629,465

[22] Filed: Nov. 6, 1975

[51] Int. Cl.$^2$ .............................................. G21B 1/00
[52] U.S. Cl. .................................... 315/111.4; 176/3; 315/111.2; 315/111.7
[58] Field of Search ............... 315/111.1, 111.2, 111.3, 315/111.4, 111.5, 111.6, 111.7, 111.8, 111.9, 111; 176/1, 2, 3

[56] References Cited

U.S. PATENT DOCUMENTS

| | | | |
|---|---|---|---|
| 2,997,436 | 8/1961 | Little et al. | 315/111.2 |
| 3,141,826 | 7/1964 | Friedrichs et al. | 315/111.7 |
| 3,230,418 | 1/1966 | Dandl et al. | 315/111.7 |
| 3,313,979 | 4/1967 | Landauer | 315/111.4 |
| 3,453,488 | 7/1969 | Cann et al. | 315/111.4 |
| 3,614,525 | 10/1971 | Uleski | 315/111.4 |
| 3,677,889 | 7/1972 | Coensgen et al. | 315/111 |

FOREIGN PATENT DOCUMENTS 1,183,473  3/1970  United Kingdom ..................... 176/3

Primary Examiner—Eugene R. LaRoche
Attorney, Agent, or Firm—Joseph E. Rusz; Willard R. Matthews, Jr.

[57] ABSTRACT

Plasma vortex structures generated by coaxial theta pinch guns are compressed and amplified by secondary adiabatic compression. A pair of vortex rings originating at opposite ends of a vacuum chamber are caused to meet at the chamber center by the confining and guiding effects of a primary magnetic mirror. A secondary magnetic mirror starts to compress the plasma as soon as the collision has occurred. The secondary compression amplifies the electrical currents and mass motions already in the vortex rings when they leave the conical theta pinch guns. The amplification process heats the plasma by a process of turbulent heating to very high temperatures.

7 Claims, 1 Drawing Figure

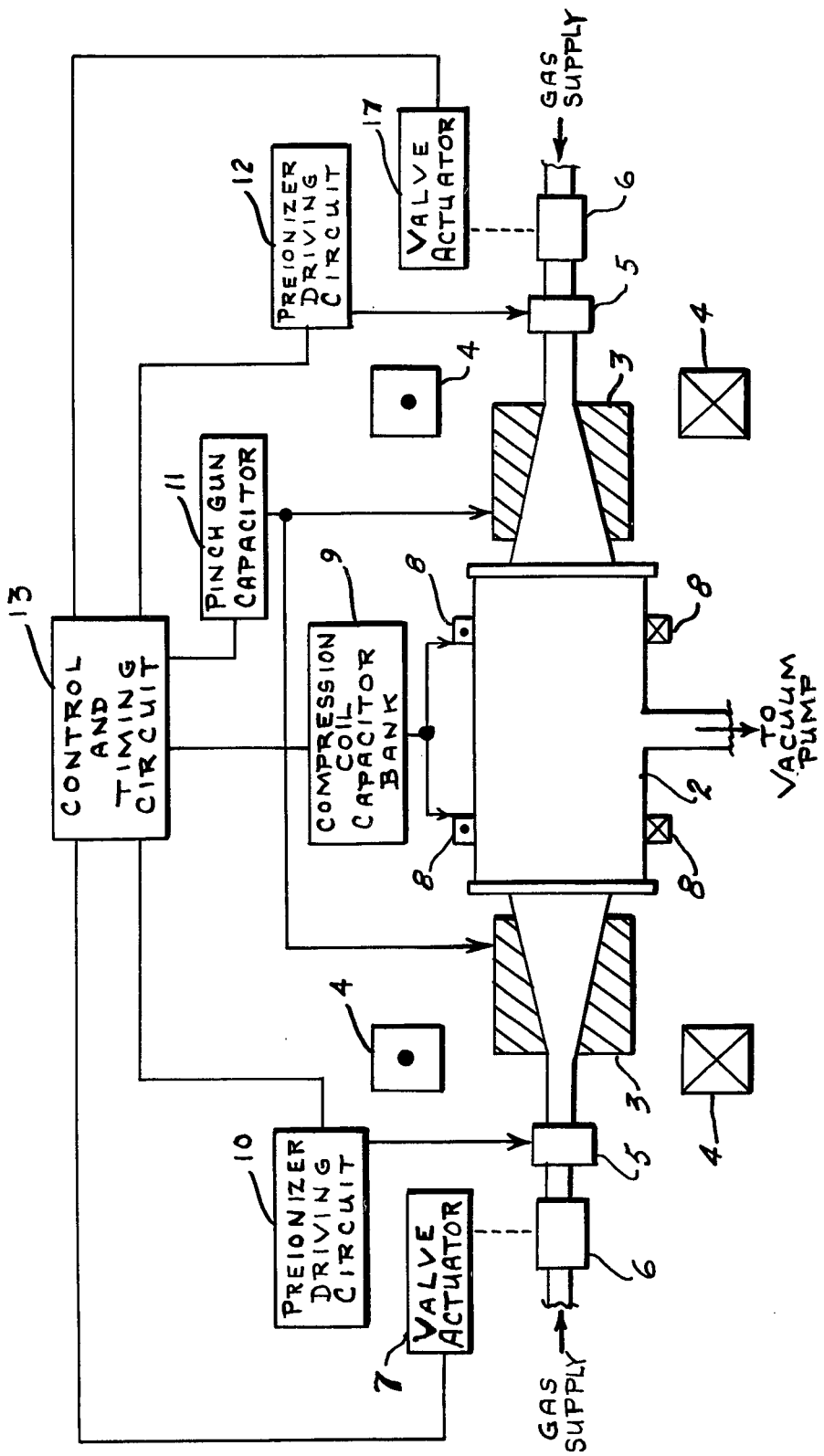

METHOD AND APPARATUS FOR HEATING AND COMPRESSING PLASMA

STATEMENT OF GOVERNMENT INTEREST

The invention described herein may be manufactured and used by or for the Government for governmental purposes without the payment of any royalty thereon.

BACKGROUND OF THE INVENTION

This invention relates to the generation of electrical energy by the thermonuclear processes, and in particular to a novel method and apparatus for heating and compressing plasma is nuclear devices.

There currently exists the need for new techniques that will permit the construction of power generating stations that are relatively small when compared to conventional thermonuclear reaction designs. It is desirable that full size power generating thermonuclear reactors be built in sizes 1000 times smaller than those possible with currently projected devices. This would enable the utilization of these machines in spacecraft designed for deep space missions. They could also be utilized for marine propulsion. In these and other applications it may also be required to provide direct conversion of thermonuclear energy to electrical energy without any intervening process involving reacting blankets (lithium blankets) and the conventional thermal cycle machinery (steam turbines) required with most conventional designs.

For various reasons state-of-the-art technology is not adequate to provide devices meeting the above criteria. Although heating plasma structures by magnetic mirror compression fields provides a solution, all previous attempts to do so have failed because current methods involve heating a plasma ring that is moving with respect to the compression coils. This results in a very low coefficient of coupling and a very inefficient heating process. Furthermore, the rate of rise of the compression field in conventional devices must be very fast requiring expensive, complex equipment.

There currently exists the need, therefore, for efficient, inexpensive means for compressing and heating plasma in thermonuclear devices. The present invention is directed toward satisfying that need.

SUMMARY OF THE INVENTION

The invention comprehends a method and means for heating and compressing plasmas to thermonuclear temperatures. The apparatus comprises a vacuum chamber containment vessel having conical theta pinch guns positioned to generate plasma vortex rings at its opposite ends. A steady state primary magnetic mirror generates a mirror field that confines and guides the plasma vortex rings to collision at the center of the containment vessel. A secondary mirror field effects compression of plasma in the vicinity of the center of the containment vessel. Control and timing circuits effect a sequence and timing of events that result in the compression and heating of the plasma when the vortex rings collide and after they have become stationary in the coordinate frame of the containment vessel.

It is a principal object of the invention to provide a new and improved method of heating and compressing plasma in nuclear devices.

It is another object of the invention to provide new and improved apparatus for heating and compressing plasma.

It is another object of the invention to provide new and improved plasma heating and compression apparatus that will permit the construction of power generating thermonuclear reactors that are orders of magnitude smaller than currently available devices.

It is another object of the invention to provide new and improved plasma heating and compression apparatus that is substantially more efficient and less expensive to construct than conventional devices.

It is another object of the invention to provide means for the generation of electrical energy by thermonuclear processes that do not require intervening processes involving reacting blankets and thermal cycle machinery.

These, together with other objects, advantages and features of the invention, will become more readily apparent from the following detailed description taken in conjunction with the illustrated embodiment in the accompanying drawing.

DESCRIPTION OF THE DRAWINGS

The sole FIGURE of the drawing is a schematic representation of one presently preferred embodiment of the invention.

DETAILED DESCRIPTION OF THE PREFERRED EMBODIMENT

Thermonculear devices of the type comprehended by the invention commonly employ means for heating and compressing plasmas to thermonuclear temperatures. However, difficulties have been encountered in the past in attempting to couple the primary currents in the conical theta pinch guns that generate plasma in these devices to the secondary currents in the plasma rings. The plasma rings move away from the guns so fast that the coupling coefficient decreases rapidly and the plasma rings move away before much energy has been transferred to them. This problem has been overcome in the present invention by abandoning the conventional attempt to couple a very big capacitor bank directly to the plasma rings. Instead, a set of plasma rings originating at each end of a primary magnetic mirror are produced in and guided by a steady-state mirror field to the center of the machine.

Apparatus designed to give effect to this technique is illustrated by the sole FIGURE of the drawing. Referring now to the FIGURE, plasma vortex structures or rings are generated by theta pinch guns 3 and injected thereby into vacuum chamber containment vessel 2. Plasma is supplied to pinch guns 3 from the system gas supply through gas valves 6 and preionizers 5. Theta pinch guns 3 are driven from pinch gun capacitor 11. The preionizers 5 are driven by preionizer driving circuits 10 and 12. Pulsed operation of the system is accomplished by controlling gas valve actuators 7 and the pinch guns and preionizers by control and timing circuits 13. The plasma rings generated by pinch guns 3 are confined and guided to the center of containment vessel 2 by means of a steady state magnetic mirror field generated by primary magnetic mirror 4. A secondary magnetic mirror field for compressing plasma in the vicinity of the center of the containment vessel is established by means of secondary magnetic mirror 8 which is driven by compression bank 9 in response to control and timing circiuits 13.

In operating, the plasma ring moving parallel to the primary mirror field has its velocity and magnetic fields anti-parallel (contrarotational). The plasma ring moving anti-parallel to the primary mirror field has its velocity and magnetic fields parallel (corotational). Both rings are force free, e.g., $\vec{J} \times \vec{B} = \mathbf{O}$ and $(\vec{V} \times \vec{V}) \times V = 0$. Thus, the contrarotational ring is right handed in $B_\theta + B_p$ and the corotational ring is left handed in $B_\theta + B_p$ where $B_\theta$ is the toriodal component of the trapped magnetic induction field in the rings and $B_p$ is the corresponding trapped polidial field. They then collide and are amplified and compressed by the secondary mirror system located at the center of the primary mirror system. The current flow in the secondary compression coils 8 is in the same direction as the currents flowing in the primary-mirror coils 4. Thus (by Lenz's law) they both compress the vortex rings and amplify their currents. The diamagnetic currents in the rings increase as the current in the secondary compression coils increases. The toroidal currents in the two rings are in the same direction. The poloidal-current components are in opposite directions. The ring currents are left-handed and right-handed helices. This gemometry is illustrated in the drawing.

In an embodiment constructed and operated according to the invention, the cylindrical vacuum chamber 2 has an 8-inch outside diameter. The centerline distance between the compression coils was 12 inches.

The base pressure in the vacuum system was $3 \times 10^{-6}$ Torr. Deuterium gas was admitted by the pulsed gas valves 6. The preionizers 5 consisted of a set of conical arc guns which strike an arc in the gas when it drifts into the preionizer region of the chamber. The effective gas pressure in the preionizers was 40 mTorr.

The conical theta pinches 3 were powered by a single General Electric "clamshell" capacitor rated at 1 $\mu$F. 50 kV. The quarter-cycle rise time on the conical theta pinches was 0.5 $\mu$sec. They ring out in 3 $\mu$sec. The peak magnetic fields in the throats of the conical theta pinch guns were 20 kG at 18 kV. The secondary compression coils 8 were powered by a $\frac{1}{4}$-MJ capacitor bank 9 consisting of a series-parallel combination of 15-$\mu$F capacitors rated at 20 kV. The current rose to a peak value in 19.6 $\mu$sec. A crowbar was activated at peak current. The decay time for the circuit was 30 $\mu$sec. The peak magnetic field produced by the secondary compression coils was 35 kG at 20 kV.

Since the rings, after collision, are stationary in the laboratory frame, the coupling problem is no longer critical and very large currents and mass motions can be induced in the double-ring system. The macroscopic toroidal conduction currents in the rings produce a long-range attraction force which draws them together; the vortex forces (mass-flow forces) and poloidal conduction currents (which are strongest near the surface of the rings and produce a short-range force) force them apart. Thus, they oscillate axially at the center of the primary mirror when the secondary mirror is applied.

There is no apparent limit to the size of the currents that can be induced or in the amount of compression that can be obtained without producing any instabilitiy in the rings. The compression mirror acts as its own magnetic containment bottle and no special auxiliary fields are required. Currents as high as 120 kA have been induced in rings compressed to 2 cm major diameter.

Thermalization of the macroscopic currents and mass motions can be accurately controlled. Thermalization begins when the compression field becomes high enough to overcome the short-range repulsive forces that hold the rings apart. The macroscopic flow energy and the energy trapped in the rings by conduction current is then turned into random thermal energy as the rings slowly decay. The ring decay rate is a function of mirror ratio and the time that the compression field remains at values high enough to contain the high-temperature plasma.

This invention achieves the objects herein set forth due to the fact that the compression occurs after the vortex rings are stationary in the containment vessel or laboratory frame. This allows the compression coils to have a very high electrical coupling coefficient with the plasma vortex rings, and thus considerable electrical current and mass motion amplification is possible.

A second inherent advantage of the method of the invention is that the efficient amplification of the currents and mass motions in the stationary plasma rings results in a turbulent heating of the plasma in times short compared to those usually obtained by conventional methods of heating.

A third and most important advantage of the invention over all other methods of plasma heating by any method is that the rate of rise of the compression field can be very small compared to those rates of rise usually required by conventional heating processes. The fact that the rise time of the compression field can be so long is associated with the fact that the compression field is amplifying currents which are in a unique configuration within the vortex rings. The rings are in a quasi-force-free configuration, i.e., the Lorentz forces and Magnus forces are close to zero everywhere in the vortex structure. This changes the effective resistivity of the rings and allows efficient heating which is almost independent of the compression field rise time. This is an important advantage over conventional heating systems because a machine which heats by slow compression is much easier and cheaper to build than one which heats by fast compression.

The invention further had advantages even over conventional machines employing slow rise time heating because the vortex rings are generating by a simple easy-to-build conical theta pinch gun which generates the required ring structure in a simple way and does not require the very elaborate machinery necesary to generate similar structures in conventional geometries. The vortex rings are naturally occurring stable structures which bring themselves to a stationary position in the laboratory frame by their own action on each other. The secondary compression is then applied by a simple slow rise time coil or coils.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of heating and compressing plasma comprising the steps of
    simultaneously injecting plasmoids into two opposite ends of a vacuum chamber,
    confining and guiding said plasmoids to collision approximately at the center of said vacuum chamber, and
    compressing the plasma in the vicinity of the center of said vacuum chamber for a discrete period of time beginning with each collision of said plasmoids.

2. The method of heating and compressing plasma defined in claim 1 wherein said plasmoids are plasma vortex structures.

3. The method of heating and compressing plasma defined in claim 2 wherein said plasma vortex structures are confined and guided by means of a primary steady state magnetic mirror field.

4. The method of heating and compressing plasma defined in claim 3 wherein the plasma in the vicinity of the center of the vacuum chamber is compressed by means of a secondary magnetic mirror field having the same polarity as the polarity of said primary steady state magnetic mirror field.

5. Apparatus for heating and compressing plasma comprising a vacuum chamber, a plasma source for generating and simultaneously injecting plasmoids into opposite ends of said vacuum chamber, means for generating a primary steady state magnetic mirror field within said vacuum chamber, said mirror field being oriented to confine and direct injected plasmoids to collision approximately at the center of said vacuum chamber, and means for compressing plasma in the vicinity of the center of said vacuum chamber for a discrete period of time beginning with each plasmoid collision event.

6. Apparatus for heating and compressing plasma as defined in claim 5 wherein said plasma source generates plasmoids in the form of plasma vortex structures.

7. Apparatus for heating and compressing plasma as defined in claim 6 wherein said means for compressing plasma includes means for providing a secondary magnetic mirror field having the same polarity as the polarity of said primary steady state magnetic mirror field.

* * * * *